Jan. 6, 1925.

W. SCROKER

PAN CONNECTER

Filed May 5, 1924

1,522,210

Patented Jan. 6, 1925.

1,522,210

UNITED STATES PATENT OFFICE.

WILLIAM SCROKER, OF WORCESTER, MASSACHUSETTS.

PAN CONNECTER.

Application filed May 5, 1924. Serial No. 711,196.

*To all whom it may concern:*

Be it known that I, WILLIAM SCROKER, a citizen of the United States, residing at Worcester, in the county of Worcester and State of Massachusetts, have invented a new and useful Pan Connector, of which the following is a specification.

This invention relates to a means for preventing the tipping over and sliding off of pans used for conveying parts around factories on trucks. It is customary in certain kinds of factories to place parts of the manufactured articles, after they have been through one machine or process, in a series of large sheet metal pans, place these pans on trucks, on which they are piled up several deep, and convey them around the shop to bring them into a position for the next operation, or sometimes they are placed on conveyors. As they are sometimes loaded beyond their capacity and those above are located in slanting or inclined position, they slide or slip off the trucks on which they are placed and cause considerable trouble and loss of time.

The principal object of this invention is to provide a simple inexpensive and practical means for connecting the pans so that they cannot slide off the trucks and cannot tip over while they are being conveyed around the shop.

The invention also involves the details of the connecting device and its combination with the pans.

Reference is to be had to the accompanying drawings, in which—

Fig. 1 is a side view of a part of a truck such as is used in certain kinds of factories showing a pile of pans containing metal parts and located thereon and also illustrating the action of this invention;

Fig. 2 is a plan of the adjacent edges of a couple of these pans with this invention in position thereon;

Fig. 3 is an end view on enlarged scale showing the connection of the pans;

Fig. 4 is a side view of one form of stud used; and

Fig. 5 is a side view partly in section of another form of stud.

As stated, it is customary to use sheet metal pans 9 for storing partly finished articles and conveying them around the factory. I do not contemplate any change in the pans themselves but for the purpose of applying this invention I provide each one with four studs 10. Each pair of studs is located on opposite ends of the pan near their edges and in axial alignment with each other. All these studs are arranged just alike on the pans so that there need be no difference in applying them.

In the form shown in Figs. 1, 2, 3 and 4 each of these studs comprises a head 11, a shank 12 at the other end and a bearing part 13 between them of larger diameter than the shank. The shank is placed through the metal wall of the pan and riveted over to form a permanent head 14 so that the stud is firmly and permanently secured in position. The bearing part 13 is of considerable length.

When the four studs are placed on the pan two of them at one edge are placed in position just as above described, but the two at the other edge are provided, before being fixed to the pan, with a pair of links 15. Each one of these links is provided with a longitudinal slot 16 near one end of a width as great as the diameter of the bearing part 13, and the link, as stated, is applied to the stud before the stud is riveted over and thereafter is permanently but pivotally mounted thereon. Each link is provided with an opening 17 in its opposite end, and I have shown these openings as of a key slot shape with an upwardly extending slot or extension 18 at right angles to the slot 16. This opening, or the circular part of it, is larger than the head 11 of one of the studs while the other part 18 of the opening is wide enough to receive one of the bearing portions 13.

In normal position, the link hangs down as shown in dotted lines in Fig. 3 and at the top of Fig. 1, but when two of these pans are placed side by side the link is moved up so that the stud of the next pan passes into the opening 17 and then is allowed to drop to the position shown in Fig. 3 and also in Fig. 1. The length of the bearing portion 13 is considerably greater than the thickness of the link 15 to permit sufficient play so that the links can be applied without lifting either end of the pan. When fastened up in the manner shown and described it will be seen that the several pans cannot be moved endwise with respect to each other except very slightly. However, they can be piled up in irregular manner, tilting one way or the other as indicated in Fig. 1 without disconnecting them or permitting them to be moved much independently of each other. If one end is higher than the other that does not affect the connections as there is sufficient play to allow for slight irregularities in that respect.

In this way the transferring of parts of manufactured articles around the factory is greatly facilitated and the loss of time and material due to upsetting of these pans is almost entirely avoided while the workmen who pile them on the trucks can do it faster because they do not have to be so particular about the location of the pans. All they have to do is to get them near enough so that they can connect them in the manner above described.

Other forms of studs can be used than the one described, and I have shown one in Fig. 5. This kind of stud is not permanently mounted, but is detachable. It has a head 21 which is shown as hollow, a bearing portion 23, and a bolt 24 which furnishes the stud passing through the wall of the pan. The end of the bearing portion 23 constitutes a shoulder and the wall of the pan can be clamped between this and the head of the bolt, so that the stud is securely fixed in position. This has advantages for some classes of work.

Although I have shown and described only two forms of the invention I am aware of the fact that modifications can be made therein by any person skilled in the art without departing from the scope of the invention as expressed in the claims. Therefore, I do not wish to be limited to all the details of construction herein shown and described, but what I do claim is:—

1. The combination with a pan for the purpose described having studs thereon and links freely and pivotally mounted on certain of said studs, each of said links having an opening through its free end large enough to receive the head of another one of said studs, whereby it can be connected to the corresponding stud on another pan to prevent displacement of the pans.

2. The combination with a pan for the purpose described having four studs thereon located on parallel axes near the four corners, and a pair of links pivotally mounted on two of said studs, each of said links having an opening through its free end large enough to receive the head of one of said studs, whereby it can be connected to the corresponding stud on another pan to prevent displacement of the pans.

3. As an article of manufacture, a pan for the purpose described, formed of sheet metal and having four headed studs on parallel axes located in pairs on the two ends of the pans near the sides thereof, a pair of links pivoted on two of said studs on the same side of the pan, each link being free to swing on its stud and of a length greater than twice the distance from the axis of its stud to the edge of the pan and having at its opposite end a perforation larger than the head of the stud, said perforation having an extension upwardly therefrom smaller than the head of the stud but larger than the bearing portion thereof, whereby it can be slipped over the head of a corresponding stud on another pan to detachably connect the two pans together.

4. As an article of manufacture, a connecting device for the purpose described comprising two studs having heads and shanks and a bearing portion between the same, a link permanently and loosely pivoted on one of said bearing portions and of a thickness less than half of the length of the bearing portion to permit freedom of motion sidewise within certain limits, said link having at its opposite end an opening large enough to receive the head of one of said studs and provided with an extension at right angles to the length of the link, wide enough to receive the bearing portion of one of said studs, whereby the link can be moved about on its pivot to bring the opening into registration with the other stud and permit the two studs to be freely and detachably connected together.

In testimony whereof I have hereunto affixed my signature.

WILLIAM SCROKER.